United States Patent
Gilman et al.

(10) Patent No.: US 8,874,293 B2
(45) Date of Patent: Oct. 28, 2014

(54) CLIMATE CONTROL ADVISORY SYSTEM AND METHOD

(75) Inventors: Dale Gilman, Beverly Hills, MI (US); Paul A Aldighieri, Grosse Pointe Farms, MI (US); Ryan J Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 13/478,881

(22) Filed: May 23, 2012

(65) Prior Publication Data
US 2013/0173101 A1 Jul. 4, 2013

Related U.S. Application Data

(60) Provisional application No. 61/581,689, filed on Dec. 30, 2011.

(51) Int. Cl.
*G06F 7/00* (2006.01)
(52) U.S. Cl.
USPC ............................................. 701/22; 701/36
(58) Field of Classification Search
USPC ............... 180/65.28, 65.285, 65.29; 903/903; 701/22, 36
See application file for complete search history.

(56) References Cited

U.S. PATENT DOCUMENTS

| 5,539,399 | A | * | 7/1996 | Takahira et al. | 340/995.27 |
| 6,864,807 | B2 | * | 3/2005 | Todoriki et al. | 340/988 |
| 7,765,058 | B2 | | 7/2010 | Doering | |
| 8,004,234 | B2 | * | 8/2011 | Walrath | 320/107 |
| 2003/0006914 | A1 | * | 1/2003 | Todoriki et al. | 340/995 |
| 2004/0062963 | A1 | * | 4/2004 | Umayahara et al. | 429/22 |
| 2006/0286419 | A1 | * | 12/2006 | Binder et al. | 429/22 |
| 2009/0043467 | A1 | | 2/2009 | Filev et al. | |
| 2009/0326753 | A1 | | 12/2009 | Chen et al. | |
| 2010/0138098 | A1 | * | 6/2010 | Takahara et al. | 701/29 |
| 2011/0153175 | A1 | | 6/2011 | Zhang et al. | |
| 2011/0160992 | A1 | * | 6/2011 | Crombez | 701/123 |
| 2012/0209465 | A1 | * | 8/2012 | Dehmann | 701/22 |
| 2013/0173102 | A1 | * | 7/2013 | Aldighieri et al. | 701/22 |
| 2013/0282265 | A1 | * | 10/2013 | Arita et al. | 701/123 |

OTHER PUBLICATIONS

Translation of WO2011026625, Dehmann Rainer, Publication Date Mar. 10, 2011.*

* cited by examiner

*Primary Examiner* — Jason Holloway
(74) *Attorney, Agent, or Firm* — Jennifer M. Stec; Brooks Kushman P.C.

(57) ABSTRACT

Many plug-in electric vehicles include a high voltage battery for outputting electrical power to a traction motor in order to propel the vehicle. The distance range of these vehicles may be impacted by usage of a climate control system. A user interface may inform vehicle operators when their current climate control usage may prevent their vehicle from reaching its next charge point. The user interface may also advise drivers to reduce their climate control usage in order to increase vehicle range when the battery is nearing low state of charge conditions.

18 Claims, 4 Drawing Sheets

CLIMATE CONTROL ADVISORY SYSTEM AND METHOD

CROSS-REFERENCE TO RELATED APPLICATIONS

This application claims the benefit of U.S. provisional Application No. 61/581,689, filed Dec. 30, 2011, the disclosure of which is incorporated in its entirety by reference herein.

TECHNICAL FIELD

One or more embodiments of the present application relate to a system and method for advising a driver of a plug-in electric vehicle to reduce usage of a climate control system via a user interface.

BACKGROUND

Plug-in electric vehicle, including battery electric vehicles (BEVs) and plug-in hybrid electric vehicles (PHEVs), may be connected to an external power supply for charging a vehicle battery. Such vehicles typically include a charge cord that extends from an external power supply and is physically connected to a vehicle charging port to facilitate charging of the vehicle battery. The vehicle battery provides electrical power to operate a motor, which generates wheel torque for propelling the vehicle. When the battery charge is depleted, the vehicle may no longer be mobile, particularly with respect to BEVs. Thus, the state of charge of the vehicle battery affects the vehicle's range. Many other factors can affect the vehicle's range as well, particularly due to their impact on the battery's state of charge. One such factor includes the usage of a climate control system to control the climate of a passenger cabin.

Vehicles include a number of interfaces, such as gauges, indicators, and displays to convey information to the driver regarding the vehicle and its surroundings. With the advent of new technologies, these user interfaces have become more sophisticated. For example, some vehicles include battery state of charge gauges and vehicle range indicators. Also, many hybrid electric vehicles (HEVs) incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as the battery. As new technologies increase in complexity, drivers rely on these interfaces to convey information that will help them optimize vehicle performance, enhance their driving experience, and safely reach their destination.

SUMMARY

According to one or more embodiments of the present application, a control system and method for advising a driver to reduce climate control system usage may include a controller and a user interface in communication with each other. The controller may be configured to receive input signals indicative of an estimated travel distance, climate control system usage, and a charge point distance. The controller may be further configured to output a message signal based upon the input signals. The user interface may be configured to output a climate advisory message in response to the message signal. The estimated travel distance may be based at least upon the state of charge of a vehicle battery. The charge point distance may be based upon a route distance between a current vehicle position and a charge point. The climate control system usage may relate to a climate control system power level, which may correspond to a current climate control system power demand relative to a maximum climate control system power demand.

The controller may be further configured to calculate a distance surplus based upon the difference between the estimated travel distance and the charge point distance. Moreover, the controller may output the message signal when the estimated travel distance is below an estimated travel distance threshold, the climate control system usage is above a climate control system usage threshold, and the distance surplus is below a distance surplus threshold. The climate advisory message may advise a vehicle operator to reduce usage of a climate control system in order to increase vehicle range. The user interface may include a display for displaying the climate advisory message.

According to one or more alternate embodiments of the present application, a control system and method for advising a driver to reduce climate control system usage in low battery conditions may include a controller and a user interface in communication with each other. The controller may be configured to receive input signals indicative of an estimated travel distance, climate control system usage, and a distance surplus. Further, the controller may be configured to output a message signal based upon the input signals. The user interface may be configured to output a climate advisory message in response to the message signal. In one or more embodiments, the controller may be further configured to receive a charge point location, determine a charge point distance based upon the charge point location and a current vehicle position, and calculate the distance surplus based upon the difference between the estimated travel distance and the charge point distance. Alternatively, the distance surplus may be based upon the estimated travel distance and a default distance budget.

The controller may output the message signal when the estimated travel distance is below an estimated travel distance threshold, the climate control system usage is above a climate control system usage threshold, and the distance surplus is below a distance surplus threshold. The climate advisory message may advise a vehicle operator to reduce usage of a climate control system due to a low battery state of charge.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In plug-in electric vehicles, the vehicle range, or distance it can travel on its current battery charge, can be greatly impacted by the use of a climate control system. One or more embodiments of the present application provide a system and method for informing drivers when their current climate control usage may potentially prevent the vehicle from reaching its next charge point. Additionally or alternatively, the system and method provided herein may advise drivers to reduce their climate control usage in order to increase vehicle range when the battery is nearing low state of charge conditions.

Figure 1:
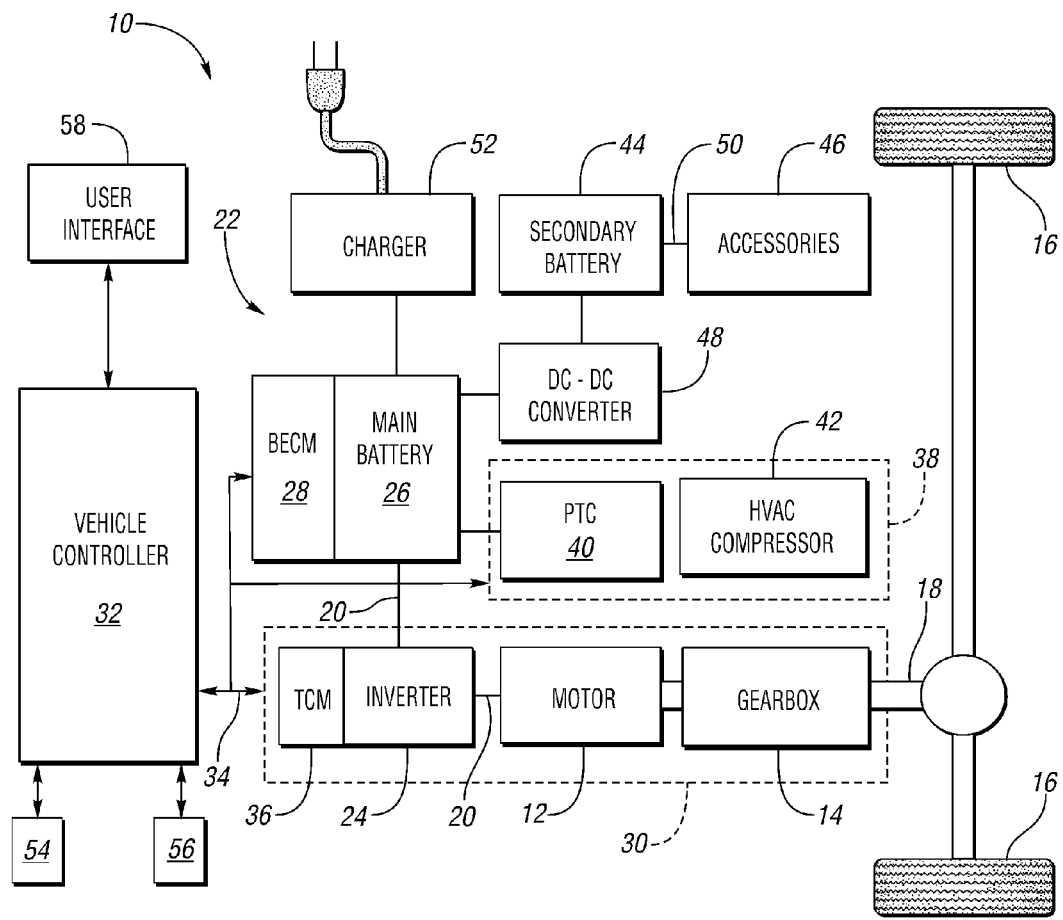
FIG. 1 is a simplified, exemplary schematic diagram of a vehicle in accordance with one or more embodiments of the present application.

Referring now to the drawings, FIG. 1 is a simplified, exemplary schematic diagram of a vehicle 10. The illustrated embodiment depicts the vehicle 10 as a battery electric vehicle (BEV), which is an all-electric vehicle propelled by one or more electric motors 12 without assistance from an internal combustion engine. The motor 12 may receive electrical power and provide mechanical rotational output power. The motor 12 may be mechanically connected to a gearbox 14 for adjusting the output torque and speed of the motor 12 by a predetermined gear ratio. The gearbox 14 may be connected to a set of drive wheels 16 by an output shaft 18. Other embodiments of the vehicle 10 may include multiple motors (not shown) for propelling the vehicle. The motor 12 may also function as a generator for converting mechanical power into electrical power. A high voltage bus 20 electrically connects the motor 12 to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a battery thermal system, such as a fluid coolant system. The BECM 28 may act as a controller for the main battery 26. The BECM 28 may also include an electronic monitoring system that manages temperature and state of charge of each of the battery cells. Other embodiments of the vehicle 10 may utilize different types of energy storage systems, such as capacitors and fuel cells (not shown).

As shown in FIG. 1, the motor 12, the gearbox 14, and the inverter 24 may collectively be referred to as a transmission 30. To control the components of the transmission 30, a vehicle control system, shown generally as a vehicle controller 32, may be provided. Although it is shown as a single controller, the vehicle controller 32 may include multiple controllers that may be used to control multiple vehicle systems. For example, the vehicle controller 32 may be a vehicle system controller/powertrain control module (VSC/PCM). In this regard, the PCM portion of the VSC/PCM may be software embedded within the VSC/PCM, or it can be a separate hardware device. The vehicle controller 32 generally includes any number of microprocessors, ASICs, ICs, memory (e.g., FLASH, ROM, RAM, EPROM and/or EEPROM) and software code to co-act with one another to perform a series of operations. The vehicle controller 32 may communicate with other controllers (e.g., BECM 28) over a hardline vehicle connection 34 using a common bus protocol (e.g., CAN).

Just as the main battery 26 includes a BECM, other devices controlled by the vehicle controller 32 may have their own controllers or sub-controllers. For example, the transmission 30 may include a transmission control module (TCM) 36, configured to coordinate control of specific components within the transmission 30, such as the motor 12 and/or the inverter 24. The TCM 36 may communicate with the vehicle controller 32 over the CAN bus 34. The TCM 36 may include a motor controller for monitoring, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various controllers can make up a control system, which, for reference purposes, may be the vehicle controller 32. Although illustrated and described in the context of the vehicle 10, which is a BEV, it is understood that embodiments of the present application may be implemented on other types of plug-in vehicles, such as plug-in hybrid electric vehicles (PHEVs).

The vehicle 10 may also include a climate control system 38 for heating and cooling various vehicle components. The climate control system 38 may include a high voltage positive temperature coefficient (PTC) electric heater 40 and a high voltage electric HVAC compressor 42. The PTC 40 may be used to heat coolant that circulates to a passenger car heater. Heat from the PTC 40 may also be circulated to the main battery 26. Both the PTC 40 and the HVAC compressor 42 may draw electrical energy directly from the main battery 26. The climate control system 38 may include a controller (not shown) for communicating with the vehicle controller 32 over the CAN bus 34. The on/off status of the climate control system 38 can be communicated to the vehicle controller 32, and can be based on, for example, the status of an operator actuated switch, or the automatic control of the climate control system 38 based on related functions such as window defrost.

In addition to the main battery 26, the vehicle 10 may include a separate, secondary battery 44, such as a typical 12-volt battery. The secondary battery 44 may be used to power various vehicle accessories, headlights, and the like (collectively referred to herein as accessories 46). A DC-to-DC converter 48 may be electrically interposed between the main battery 26 and the secondary battery 44. The DC-to-DC converter 48 may adjust, or "step down" the voltage level to allow the main battery 26 to charge the secondary battery 44. A low voltage bus 50 may electrically connect the DC-to-DC converter 48 to the secondary battery 44 and the accessories 46.

The vehicle 10 may further include an alternating current (AC) charger 52 for charging the main battery 26. The AC charger 52 may be connected to a charging port (not shown) for receiving AC power from an external power supply. The external power supply may include an adapter (e.g., a plug) for connecting to the charging port at the vehicle's exterior.

The external power supply itself may be connected to an electrical power grid. The AC charger 52 may include power electronics used to convert, or "rectify" the AC power received from the external power supply to DC power for charging the main battery 26. The AC charger 52 may be configured to accommodate one or more conventional voltage sources from the external power supply (e.g., 110 volt, 220 volt, etc.).

Also shown in FIG. 1 are simplified schematic representations of a driver controls system 54 and a navigation system 56. The driver controls system 54 may include braking, acceleration, and gear selection (shifting) systems (all not shown). The braking system may include a brake pedal, position sensors, pressure sensors, or some combination thereof, as well as a mechanical connection to the vehicle wheels, such as the primary drive wheels 16, to effect friction braking. The braking system may also be configured for regenerative braking, wherein braking energy may be captured and stored as electrical energy in the main battery 26. The acceleration system may include an accelerator pedal having one or more sensors, which, like the sensors in the braking system, may provide information such as throttle input to the vehicle controller 32. The gear selection system may include a shifter for manually selecting a gear setting of the gearbox. The gear selection system may include a shift position sensor for providing shifter selection information (e.g., PRNDL) to the vehicle controller 32. The navigation system 56 may include a navigation display, a global positioning system (GPS) unit, a navigation controller and inputs for receiving destination information or other data from a driver. These components may be unique to the navigation system 56 or shared with other systems. The navigation system 56 may also communicate distance and/or location information associated with the vehicle 10, its target destinations, charge point locations, or other relevant GPS waypoints.

In addition to the foregoing, the vehicle 10 may include a user interface 58 to facilitate communications with a driver. The user interface 58 may communicate with the vehicle controller 32 and may provide relevant vehicle content to a driver of the vehicle 10. The vehicle controller 32 may be configured to receive input signals that are indicative of current operating and environmental conditions of the vehicle 10. For instance, the vehicle controller 32 may receive input signals from the BECM 28, the transmission 30 (e.g., motor 12 and/or inverter 24), the climate control system 38, the driver controls the system 54, the navigation system 56, or the like. The vehicle controller 32 may provide output to the user interface 58 such that the user interface 58 conveys advisory messages and/or reminders that can help improve the vehicle range, performance, or other information relating to the operation of the vehicle 10 to a driver.

Figure 2:
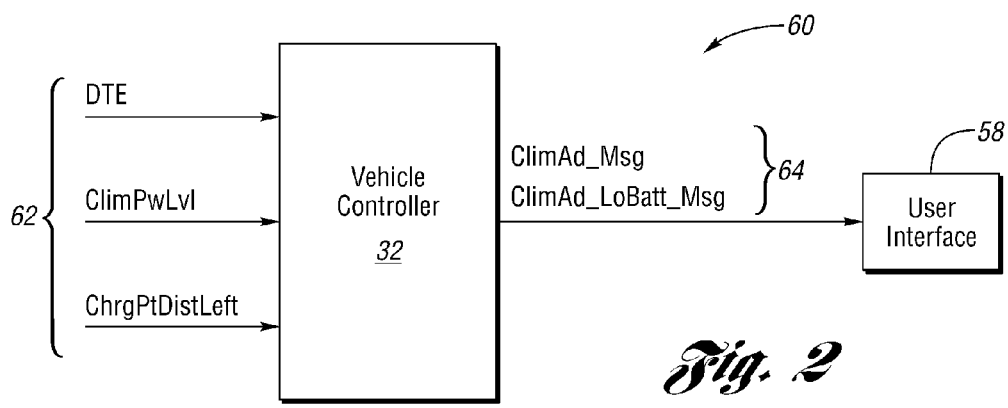
FIG. 2 is a simplified, functional block diagram of a control system for the vehicle in accordance with one or more embodiments of the present application.

FIG. 2 is a simplified, functional block diagram of a control system 60 for the vehicle in accordance with one or more embodiments of the present application. The control system 60 may include the vehicle controller 32 and the user interface 58 that are in communication with each other. The vehicle controller 32 may receive input signals 62 indicative of vehicle and/or environmental conditions and may output one or more message signals 64 in response to the input signals 62. The vehicle controller 32 may transmit the message signals 64 to the user interface 58, which may in turn convey a climate advisory message corresponding to the message signal 64 to the driver. The vehicle controller 32 may output the message signal 64 based on whether the input signals 62 indicate that certain conditions are met. According to one or more embodiments, the input signals 62 may be indicative of an estimated travel distance, climate control system usage, and a distance surplus. As FIG. 2 is a functional block diagram, the input signals 62 indicative of the estimated travel distance, climate control system usage, and the distance surplus may be functional inputs to an algorithm executed by the vehicle controller 32, rather than direct inputs to the vehicle controller. Accordingly, the input signals 62 may merely be representative of other input signals used to calculate or otherwise determine the estimated travel distance, the climate control system usage, and distance surplus.

To this end, the estimated travel distance (e.g., the vehicle's current range or "distance to empty") (DTE) may be based upon the current state of charge of the main battery 26. Additionally, the estimated travel distance (DTE) may be based upon, for example, accessory load, driver driving behavior, climate conditions, route topography, or the like. The climate control system usage (ClimPwLvl) may correspond to a climate control system power level. The climate control system power level may correspond to a current climate control system power demand relative to a maximum climate control system power demand. Thus, the climate control system power level may be a percentage representing the current electrical power demand by the climate control system 38 relative to the maximum amount of electrical power that the climate control system may demand.

The distance surplus (DistSurp) may correspond to additional energy available in the main battery 26 over the amount of energy necessary to reach a target destination, such as a charge point location. According to one or more embodiments, the distance surplus (DistSurp) may be based on the difference between the estimated travel distance (DTE) and the remaining charge point distance (ChrgPtDistLeft). Moreover, the charge point distance (ChrgPtDistLeft) may be based on a route distance between a charge point location and the vehicle's current location, rather than an actual distance. When the estimated travel distance (DTE) for the vehicle 10 exceeds the charge point distance (ChrgPtDistLeft), the distance surplus (DistSurp) may be positive indicating the main battery 26 has sufficient energy to propel the vehicle 10 to the target (e.g., next charge point location) under the current operating conditions. When the charge point distance (ChrgPtDistLeft) exceeds the estimated travel distance (DTE), the distance surplus (DistSurp) may be negative (also referred to as a "debt" or "deficit") indicating that the available energy in the main battery 26 will likely be insufficient to reach the current target, perhaps unless the vehicle operates more efficiently or a new target is selected. The charge point location may be input by the vehicle driver via the navigation system 56 or the user interface 58. When no charge point information is input by a driver, a default target destination distance may be established or set by the control system 60. For instance, the vehicle controller 32 may set a default distance budget ($Dist_{budg}$) based upon an initial distance to empty estimate ($DTE_{init}$). The initial distance to empty estimate ($DTE_{init}$) may be taken from the start of a trip. As a trip unfolds, the distance budget ($Dist_{budg}$) may correspond to the initial distance to empty estimate ($DTE_{init}$) from the trip start less the trip distance ($Dist_{trip}$). In this manner, the distance surplus (DistSurp) may be a budgeted distance surplus based on the difference between the current estimated travel distance (DTE) and the current distance budget ($Dist_{budg}$).

According to one or more embodiments of the present application, the controller may output the message signal 64 when the input signals 62 indicate the estimated travel distance (DTE) is below an estimated travel distance threshold, the climate control system usage (ClimPwLvl) is above a climate control system usage threshold, and the distance surplus (DistSurp) is below a distance surplus threshold. As previously described, the message signal 64 may correspond to a climate advisory message that may be conveyed by the user interface 58 upon receipt of the message signal 64. In one or more embodiments, the message signal 64 may correspond to a general climate advisory message (ClimAd_Msg) that may be conveyed when the main battery 26 is not nearing a low charge condition. As used herein, a low charge condition may occur when the estimated travel distance (DTE) is at or below a low distance-to-empty warning limit ($DTE_{lo\_warn\_limit}$). The low distance-to-empty warning limit ($DTE_{lo\_warn\_limit}$) may be a predetermined system limit or may be a user selectable limit (e.g., 5, 10 or 15 miles) for notifying the driver when the main battery 26 has reached a low charge condition. Alternatively, the message signal 64 may correspond to a low battery climate advisory message (ClimAd_LoBatt_Msg) that may be conveyed when the main battery 26 is in a low charge condition.

Figure 3:
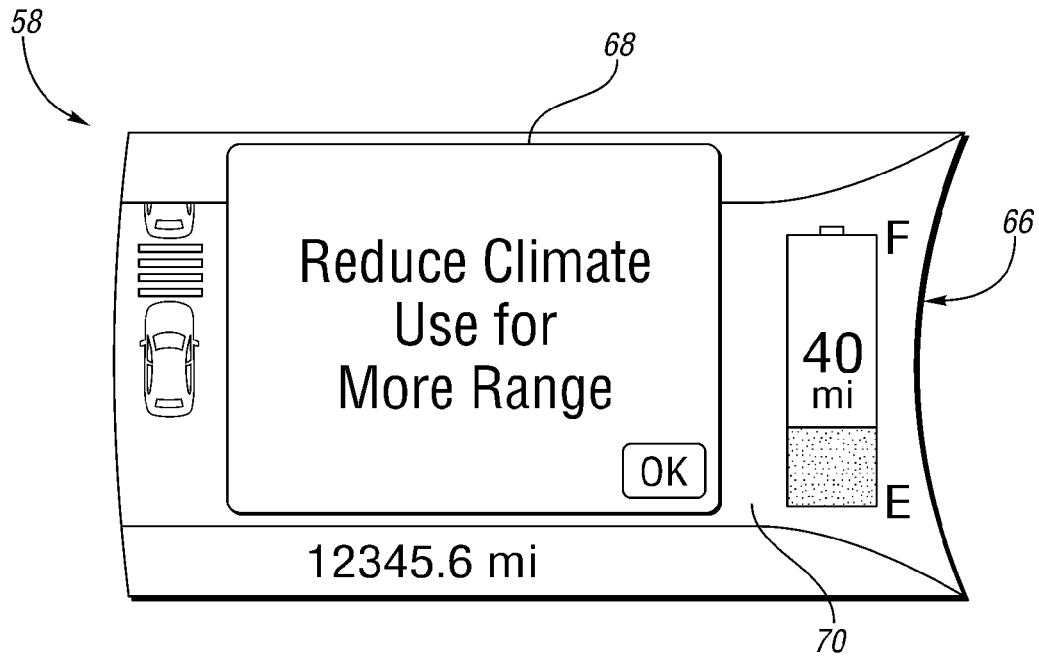
FIG. 3 depicts an exemplary climate advisory message that may be output by a user interface in accordance with one or more embodiments of the present application.

FIG. 3 depicts an exemplary general climate advisory message (ClimAd_Msg) that may be output by the user interface 58 in response to a message signal 64 when the main battery 26 is not nearing a low charge condition, in accordance with one or more embodiments of the present application. As seen therein, the user interface may include a display 66 and associated circuitry, including hardware and/or software, necessary to communicate with the vehicle controller 32 and operate the display 66. The display 66 may be generally used to convey relevant vehicle content to a driver of the vehicle 10 including, for example, information relating to the operation of the vehicle 10 or advice for improving vehicle range, performance and/or efficiency. The display 66 may be disposed within a dashboard (not shown) of the vehicle 10, such as in an instrument panel or center console area. Moreover, the display 66 may be part of another user interface system, such as the navigation system 56, or may be part of a dedicated information display system. The display 66 may be a liquid crystal display (LCD), a plasma display, an organic light emitting display (OLED), or any other suitable display. The display 66 may include a touch screen for receiving driver input associated with selected areas of the display. The user interface 58 or display 66 may also include one or more buttons (not shown), including hard keys or soft keys, for effectuating driver input.

According to one or more embodiments, the general climate advisory message (ClimAd_Msg) may be a pop-up message 68 that is displayed over a display screen 70 when the input signals 62 indicate the estimated travel distance (DTE) is below an estimated travel distance threshold ($DTE_{thresh}$), the climate control system usage (ClimPwLvl) is above a climate control system usage threshold ($ClimPwLvl_{thresh}$), and the distance surplus (DistSurp) is below a distance surplus threshold ($DistSurp_{thresh}$). When the main battery 26 is not in low-charge condition as described above (e.g., $DTE>DTE_{lo\_warn\_limit}$), the estimated travel distance threshold ($DTE_{thresh}$), the climate control system usage threshold ($ClimPwLvl_{thresh}$), and the distance surplus threshold ($DistSurp_{thresh}$) may be predetermined, calibrated system thresholds for triggering the general climate advisory message (ClimAd_Msg). As non-limiting examples, the estimated travel distance threshold ($DTE_{thresh}$) may be approximately 80 miles and the climate control system usage threshold ($ClimPwLvl_{thresh}$) may be approximately 25%. As shown in FIG. 3, the general climate advisory message (ClimAd_Msg) may inform a driver to reduce usage of the climate control system in order to increase vehicle range. According to one or more embodiments, the general climate advisory message (ClimAd_Msg) may only be displayed when charge point information is received by the vehicle controller 32.

Figure 4:
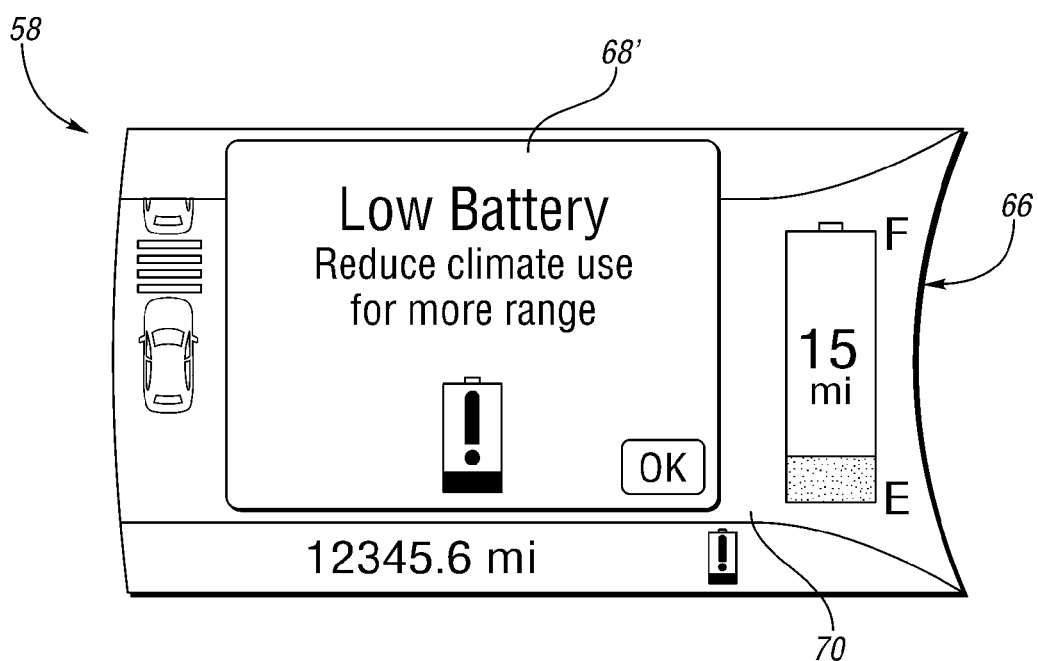
FIG. 4 depicts another exemplary climate advisory message that may be output by a user interface in accordance with one or more embodiments of the present application.

FIG. 4 depicts an exemplary low battery climate advisory message (ClimAd_LoBatt_Msg) that may be output by the user interface 58 in response to a message signal 64 when the main battery 26 is in a low charge condition, in accordance with one or more embodiments of the present application. According to one or more embodiments, the low battery climate advisory message (ClimAd_LoBatt_Msg) may be a pop-up message 68' that is displayed over the display screen 70 when the input signals 62 indicate the estimated travel distance (DTE) is below an estimated travel distance threshold ($DTE_{thresh}$), the climate control system usage (ClimPwLvl) is above a climate control system usage threshold ($ClimPwLvl_{thresh}$), and the distance surplus (DistSurp) is below a distance surplus threshold ($DistSurp_{thresh}$). When the main battery 26 is in the low-charge condition as described above (e.g., $DTE<DTE_{lo\_warn\_limit}$), the estimated travel distance threshold ($DTE_{thresh}$) may be the low distance-to-empty warning limit ($DTE_{lo\_warn\_limit}$) (e.g., 5, 10 or 15 miles). Moreover, the climate control system usage threshold ($ClimPwLvl_{thresh}$) may be a low distance-to-empty climate usage threshold ($ClimPwLvl_{thresh\_lo\_DTE}$) (e.g., 5%). The distance surplus threshold ($DistSurp_{thresh}$) may be a low distance-to-empty distance surplus threshold ($DistSurp_{thresh\_lo\_DTE}$) (e.g., −1 mile). As shown in FIG. 4, the low battery climate advisory message (ClimAd_LoBatt_Msg) may inform a driver of the low battery condition as well as advise the driver to reduce usage of the climate control system 38 in order to increase vehicle range.

Both the general climate advisory message (ClimAd_Msg) and the low battery climate advisory message (ClimAd_LoBatt_Msg) may be output by the user interface multiple times during an ignition cycle. Moreover, the control system 60 may provide a hysteresis of a predetermined, calibratable distance in order to avoid the climate advisory messages from appearing briefly before disappearing and reappearing again as the input conditions change in real-time. Accordingly, the climate advisory messages will not appear to be conveyed intermittently.

Furthermore, the climate advisory messages illustrated in FIGS. 3 and 4 are merely exemplary; alternate messages may be displayed or otherwise conveyed by the user interface 58 without departing from the scope of the present application. Moreover, the user interface 58 may also include at least one speaker or telltale (not shown) for conveying the climate advisory messages. The speaker may output the climate advisory message audibly in response to the input signals. The telltale may be disposed within the dashboard similar to the display 66. The telltale may be a dedicated indicator that illuminates when the conditions for outputting the climate advisory messages are satisfied.

Figure 5:
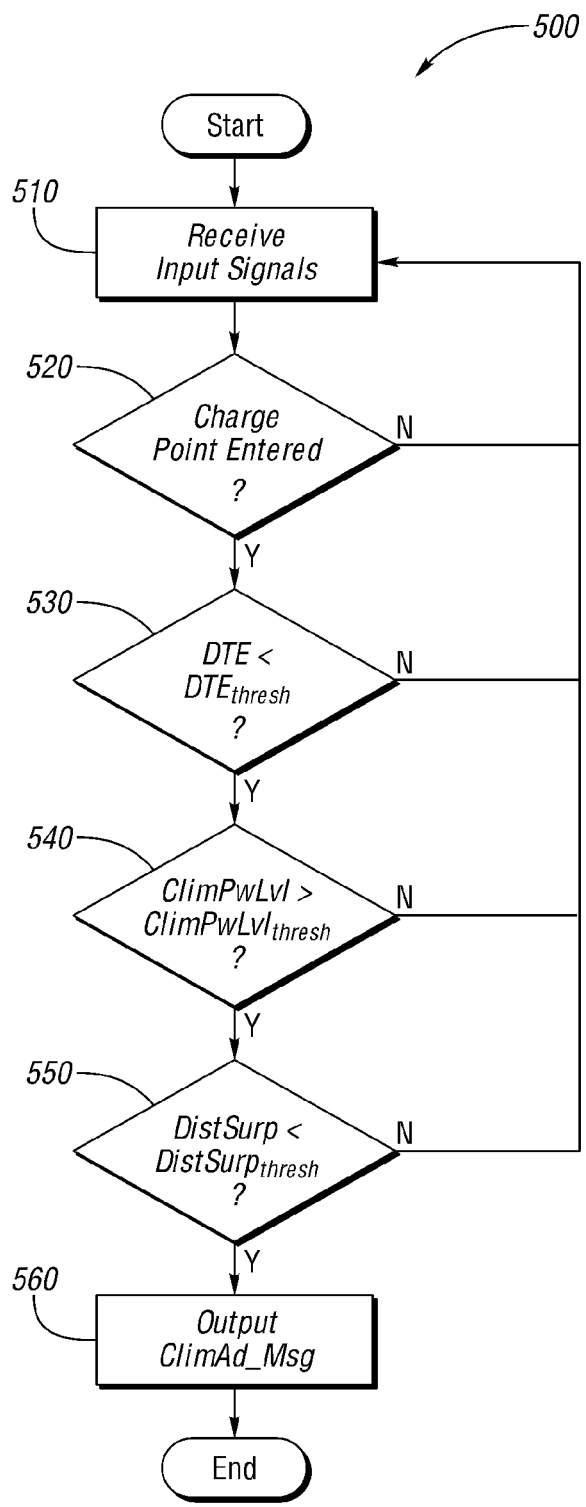
FIG. 5 is a simplified, exemplary flow chart depicting a method for conveying a climate advisory message in accordance with one or more embodiments of the present application.

FIG. 5 is a simplified, exemplary flow chart depicting a method 500 for conveying a general climate advisory message (ClimAd_Msg) in accordance with one or more embodiments of the present application. As previously described, the general climate advisory message (ClimAd_Msg) may be conveyed when the main battery 26 is not nearing a low charge condition (e.g., $DTE>DTE_{lo\_warn\_limit}$). At step 510, the control system 60 may receive the input signals 62. The input signals 62 may be indicative of an estimated travel distance (DTE), climate control system usage (ClimPwLvl), and a charge point distance (ChrgPtDistLeft). Moreover, the charge point distance (ChrgPtDistLeft) may be further indicative of a distance surplus (DistSurp). For instance, the distance surplus (DistSurp) may be calculated by subtracting the charge point distance (ChrgPtDistLeft) from the estimated travel distance (DTE). At step 520, the control system 60 may determine whether the input signals 62 include charge point information. If no charge point information has been entered, the method may return to step 510. If the input signals include charge point information, the method may proceed to step 530. At step 530, the control system 60 may compare the estimated travel distance (DTE) to an estimated travel distance threshold ($DTE_{thresh}$). If the estimated travel distance (DTE) is below the estimated travel distance threshold ($DTE_{thresh}$), the method may proceed to step 540. Otherwise, the method may return to step 510.

At step 540, the control system 60 may compare the climate control system usage (ClimPwLvl) to a climate control system usage threshold ($ClimPwLvl_{thresh}$). If the climate control system usage (ClimPwLvl) is above the climate control system usage threshold ($ClimPwLvl_{thresh}$), the method may proceed to step 550. Otherwise, the method may return to step 510. At step 550, the control system 60 may compare the distance surplus (DistSurp) to a distance surplus threshold ($DistSurp_{thresh}$). If the distance surplus (DistSurp) is below the distance surplus threshold ($DistSurp_{thresh}$), the method may proceed to step 560. Otherwise, the method may return to step 510. At step 560, the user interface 58 may output the general climate advisory message (ClimAd_Msg). For example, the user interface 58 may display the general climate advisory message (ClimAd_Msg) for a driver on the display 66. The general climate advisory message (ClimAd_Msg) may inform a driver to reduce usage of the climate control system 38 in order to increase vehicle range.

Figure 6:
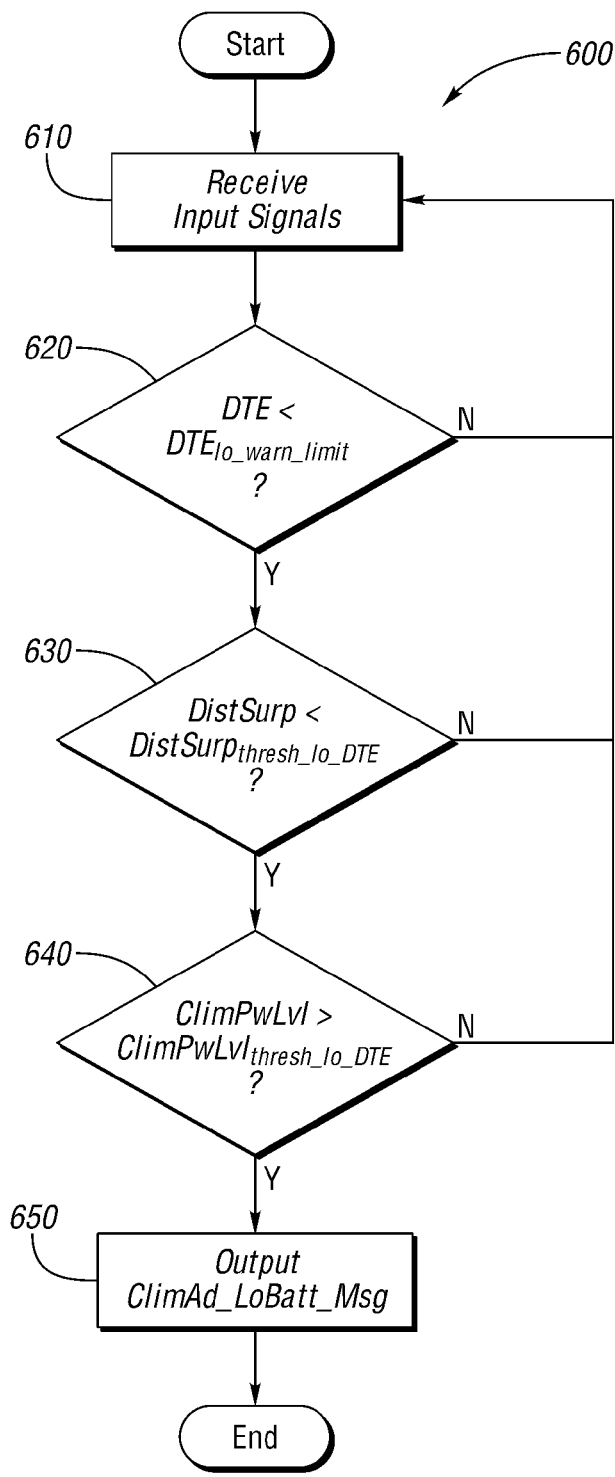
FIG. 6 is a simplified, exemplary flow chart depicting an alternate method for conveying a climate advisory message in accordance with one or more embodiments of the present application.

FIG. 6 is a simplified, exemplary flow chart depicting a method 600 for conveying a low battery climate advisory message (ClimAd_LoBatt_Msg) in accordance with one or more embodiments of the present application. As previously described, the low battery climate advisory message (ClimAd_LoBatt_Msg) may be conveyed when the main battery 26 is in a low charge condition (e.g., DTE<= $DTE_{lo\_warn\_limit}$). At step 610, the control system 60 may receive the input signals 62. The input signals 62 may be indicative of an estimated travel distance (DTE), climate control system usage (ClimPwLvl), and a distance surplus (DistSurp). The distance surplus (DistSurp) may be based upon the estimated travel distance (DTE) and a charge point distance (ChrgPtDistLeft) when a charge point location or initial charge point distance is input. Alternatively, the distance surplus (DistSurp) may be based upon the estimated travel distance (DTE) and a default distance budget ($Dist_{budg}$), as described above, when no charge point information is input. At step 620, the control system 60 may compare the estimated travel distance (DTE) to the low distance-to-empty warning limit ($DTE_{lo\_warn\_limit}$). If the estimated travel distance (DTE) is below the low distance-to-empty warning limit ($DTE_{lo\_warn\_limit}$), the method may proceed to step 630. Otherwise, the method may return to step 610.

At step 630, the control system 60 may compare the distance surplus (DistSurp) to a low distance-to-empty distance surplus threshold ($DistSurp_{thresh\_lo\_DTE}$). If the distance surplus (DistSurp) is below the low distance-to-empty distance surplus threshold ($DistSurp_{thresh\_lo\_DTE}$), the method may proceed to step 640. Otherwise, the method may return to step 610. At step 640, the control system 60 may compare the climate control system usage (ClimPwLvl) to a low distance-to-empty climate usage threshold ($ClimPwLvl_{thresh\_lo\_DTE}$). If the climate control system usage (ClimPwLvl) is above the low distance-to-empty climate usage threshold ($ClimPwLvl_{thresh\_lo\_DTE}$), the method may proceed to step 650. Otherwise, the method may return to step 610. At step 650, the user interface 58 may output the low battery climate advisory message (ClimAd_LoBatt_Msg). For example, the user interface 58 may display the low battery climate advisory message (ClimAd_LoBatt_Msg) for a driver on the display 66. The low battery climate advisory message (ClimAd_LoBatt_Msg) may inform a driver of the low battery condition as well as advise the driver to reduce usage of the climate control system 38 in order to increase vehicle range.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A control system for a vehicle comprising:
a controller configured to calculate a distance surplus based upon a difference between an estimated travel distance and a charge point distance, and output a message signal when the estimated travel distance is below an estimated travel distance threshold, climate control system usage is above a climate control system usage threshold, and the distance surplus is below a distance surplus threshold; and
a user interface in communication with the controller and configured to output a climate advisory message in response to the message signal.

2. The control system of claim 1, wherein the estimated travel distance is based at least upon a state of charge of a vehicle battery.

3. The control system of claim 1, wherein the charge point distance is based upon a route distance between a current vehicle position and a charge point.

4. The control system of claim 1, wherein the climate control system usage corresponds to a climate control system power level.

5. The control system of claim 4, wherein the climate control system power level corresponds to a current climate control system power demand relative to a maximum climate control system power demand.

6. The control system if claim 1, wherein the climate advisory message advises a vehicle operator to reduce usage of a climate control system in order to increase vehicle range.

7. The control system of claim 6, wherein the user interface includes a display for displaying the climate advisory message.

8. A method comprising:
calculating, using a controller, a distance surplus based upon an estimated travel distance and a charge point distance; and
displaying, using a display, a climate advisory message when the estimated travel distance is below an estimated travel distance threshold, climate control system usage is above a climate control system usage threshold, and the distance surplus is below a distance surplus threshold.

9. The method of claim 8, wherein the step of outputting the climate advisory message includes displaying the climate advisory message on a vehicle display.

10. The method of claim 8, wherein the estimated travel distance is based at least upon a state of charge of a vehicle battery.

11. The method of claim 8, wherein the charge point distance is based upon a route distance between a current vehicle position and a charge point.

12. The method of claim 8, wherein the climate control system usage corresponds to a climate control system power level.

13. The method of claim 12, wherein the climate control system power level corresponds to a current climate control system power demand relative to a maximum climate control system power demand.

14. A control system for a vehicle comprising:
a controller configured to calculate a distance surplus based upon a difference between an estimated travel distance and a charge point distance, and output a message signal when the estimated travel distance is below a first estimated travel distance threshold, climate control system usage is above a first climate control system usage threshold, and the distance surplus is below a first distance surplus threshold; and
a user interface in communication with the controller and configured to output a climate advisory message in response to the message signal, the climate advisory message advising a vehicle operator to reduce usage of a climate control system in order to increase vehicle range.

15. The control system of claim 14, wherein the climate advisory message system due to includes a low battery state of charge warning when the estimated travel distance is below a second estimated travel distance threshold, the climate control system usage is above a second climate control system usage threshold, and the distance surplus is below a second distance surplus threshold.

16. The control system of claim 15, wherein the second estimated travel distance threshold is less than the first estimated travel distance threshold.

17. The control system of claim 15, wherein the second climate control system usage threshold is less than the first climate control system usage threshold.

18. The control system of claim 15, wherein the second distance surplus threshold is less than the first distance surplus threshold.

* * * * *

UNITED STATES PATENT AND TRADEMARK OFFICE
CERTIFICATE OF CORRECTION

| | | |
|---|---|---|
| PATENT NO. | : 8,874,293 B2 | Page 1 of 1 |
| APPLICATION NO. | : 13/478881 | |
| DATED | : October 28, 2014 | |
| INVENTOR(S) | : Dale Gilman et al. | |

It is certified that error appears in the above-identified patent and that said Letters Patent is hereby corrected as shown below:

In the Claims

Column 12, Line 2, Claim 15:

After "advisory message"
Delete "system due to".

Signed and Sealed this
Fifteenth Day of September, 2015

Michelle K. Lee
*Director of the United States Patent and Trademark Office*